UNITED STATES PATENT OFFICE 2,518,089

METHACRYLONITRILE PROCESS

Leo J. Spillane, Rockaway Township, Morris County, N. J., assignor to Allied Chemical & Dye Corporation, New York, N. Y., a corporation of New York No Drawing. Application December 18, 1948, Serial No. 66,149

12 Claims. (Cl. 260—465.9)

This invention relates to synthesis of aliphatic nitriles containing between 2 and 5 carbon atoms, inclusive, in the molecule from primary nitroso compound dimers and from aldoximes, and more particularly relates to synthesis of acrylonitriles containing 3–5 carbon atoms from olefin-nitrosyl chloride adducts.

It is known to prepare nitriles by action on aldoximes of stoichiometric quantities or excess of a dehydrating agent such as acetic anhydride. Further it has been proposed to obtain methacrylonitrile from the nitrosyl chloride adducts of isobutylene (a primary nitroso compound dimer) by action of stoichiometric quantities or excess of acetic anhydride and quinoline. The anhydride dehydrating agent is converted in processes such as the above to the corresponding acid and must be reconverted to anhydride before it may again be used in the reaction.

It is an object of my invention to produce aliphatic nitriles of 2–5 carbon atoms by heating in liquid phase primary nitroso compound dimers or aldoximes with only catalytic quantities of other materials.

A further object is to provide a process for producing nitriles by heating in liquid phase primary nitroso compound dimers or aldoximes in which process other materials making up the reaction mixture are recovered unchanged and may be reused directly in the process.

Another object is to obtain methacrylonitrile from isobutylene-nitrosyl chloride adduct in high yield by a catalytic reaction, avoiding the necessity to use stoichiometric quantities of reagents.

Other objects and advantages will appear hereinafter.

In accordance with my invention I form in liquid phase at temperatures of at least about 150° C. a reaction mixture containing a primary nitroso compound dimer or an aldoxime, at least catalytic quantities of a weak organic base especially a weak aromatic tertiary nitrogen organic base and at least catalytic quantities of a vicinal dicarboxylic acid appreciably soluble in the reaction mixture; and maintain the reaction mixture at temperatures of at least about 150° C. until nitrile is formed. (The formation of nitrile, which is accompanied by loss of water from the nitroso compound dimer or aldoxime, may be recognized by appearance of an aqueous distillate or by conventional tests for presence of nitrile in the reaction products.) Addition of such acid, even when another acid is already present, results in more than doubling the yield of some nitriles.

In particular, my process applies to volatile nitriles, distilling at atmospheric pressure below about 150° C., which may be distilled out of the reaction mixture as they are formed.

Nitriles obtainable by my process include both saturated and unsaturated nitriles. For example, saturated fatty acid nitriles may be obtained using the corresponding aldoxime as starting material; and by starting with an unsaturated aldoxime, an unsaturated nitrile is obtained. My process gives exceptional yields of nitriles from primary nitroso compound dimers, and at the same time effects dehydrohalogenation of 1-nitroso, 2-halo compounds containing at least three carbon atoms. Thus my process is preeminently suitable for converting 1-nitroso, 2-chloro dimeric compounds to unsaturated nitriles, in particular acrylonitrile, methacrylonitrile and alpha-ethylacrylonitrile.

A preferred embodiment of my invention is conversion of isobutylene-nitrosyl chloride adduct to methacrylonitrile. Isobutylene-nitrosyl chloride adduct is a dimeric 1-nitroso, 2-chloro compound obtainable as a white crystalline solid melting at about 104° C. with decomposition and having the empirical formula $(C_4H_8NOCl)_2$. Among art describing this solid and methods for its preparation is U. S. P. 2,394,430 of February 5, 1946, to Crowder et al.

Bases which may be used as the catalytic bases in my process are weak organic bases sufficiently stable to exist as such under the reaction conditions. These catalytic bases include aromatic tertiary nitrogen bases, i. e. bases in which all nitrogen atoms are attached to carbon atoms and to at least one carbon atom of an aromatic ring. Bases boiling above about 170° C. at atmospheric pressure are especially suitable. Among bases of the above type which have been tested and found to give good results in my process are quinoline, isoquinoline, quinaldine, tetramethylpyrazine, dimethyl aniline, homologs of the above (such as 3 methyl isoquinoline), and pyridine homologs of boiling point 170° C. or above (such as 2,4,6-collidine and 2-nonyl pyridine). These bases have dissociation constants, $K_B$, of the order of $10^{-10}$ to $10^{-9}$. Of the above bases quinoline, quinaldine and isoquinoline are especially preferred as readily giving high yields and being readily available.

Weak non-aromatic bases have also been used successfully, for example N-ethyl acetamide and sodium hydrogen alkenyl succinates. Bases such as N-ethyl acetamide, however, tend to be hydrolyzed under the reaction conditions and accordingly their use occasions some loss of catalytic base.

The bases employed need not be pure but may be mixtures, for example, commercial fractions from coal tar.

The base is used in at least catalytic quantities, but stoichiometric quantities or larger amounts may be used if desired without adverse effect on yields. Preferably the amount of base present is at least about equivalent to any acid present. When an acidic compound is formed during the reaction, e. g. when hydrogen halide is formed during production of unsaturated nitriles from halogenated compounds, sufficient base is used to take up such acid, but not all this base need be the base used as catalyst. For example, an alkali metal salt of an organic acid, or other base soluble in the reaction mixture, may be used to take up hydrogen halide while an aromatic tertiary nitrogen base is used as catalyst. The quantity of base employed will usually be between about 1 and about 2 mols per mol of nitrile-forming reactant, quantities less than 1 mol being used in particular when no strong acid is formed during the reaction.

Vicinal dicarboxylic acids (i. e. acids in which the carboxyl groups are attached to each of two adjoining carbon atoms), suitable for use in my process must, like the bases, be sufficiently stable to exist as dicarboxylic acids under the reaction conditions. They must also be appreciably soluble in the reaction mixture.

Succinic acid is the simplest representative of vicinal dicarboxylic acids. This acid is operative in my process but other vicinal dicarboxylic acids are preferred thereto because of higher activity, which is perhaps due to the greater solubility of other acids in the usual reaction mixtures of my process. Substituted succinic acids such as alkylsuccinic acids, (e. g. methylsuccinic acid), itaconic acid, and alkenylsuccinic acids (formed via reaction of olefins with maleic anhydride) have all been tested and found to be active catalytic acids in my process. Aromatic vicinal dicarboxylic acids, e. g. phthalic acid and anthracene succinic acid (formed via addition of anthracene and maleic anhydride) are other examples of acids which have been tested and found catalytically active in my process. Alicyclic vicinal dicarboxylic acids have likewise been found catalytically active in my process, e. g. 1,2 dicarboxycyclohexene-4 formed via addition of butadiene to maleic anhydride. (Maleic acid itself is converted to the anhydride below 150° C. and therefore is unsuitable for use in the process of my invention.)

Phthalic acid has exceptional activity and stability under the conditions of my process and therefore is a preferred choice as the catalytic acid. A mixture of alkenylsuccinic acids containing between 6 and 16 carbon atoms in the alkenyl chains is also a preferred choice as catalytic acid, for similar reasons.

The vicinal dicarboxylic acid may be introduced as such into the reaction zone or may be formed in situ. For example, the vicinal dicarboxylic acid may be formed by interaction of water and the corresponding acid anhydride at the reaction temperatures, or by interaction of an acid and a salt of the dicarboxylic acid. Or the dicarboxylic acid may be formed by rearrangement or other chemical reaction taking place under the reaction conditions, e. g. rearrangement of citraconic anhydride to itaconic anhydride and formation of itaconic acid by addition of water to the anhydride.

The catalytic acid used in my process must be stable, except for possible salt formation with bases present, under my reaction conditions. Preferably both a mineral acid such as hydrochloric and a vicinal dicarboxylic acid are present. Acid is present in at least catalytic quantities, but stoichiometric quantities (based on the nitrile-forming reactant) or more may be used. Preferably the acid present as catalyst and any other acid present or formed during the reaction is not more than about the equivalent of the total base present. Suitable quantities of catalytic acid are from about 0.1 mol to about 1 mol of acid per mol of aldoxime or half-mol of nitroso compound dimer reactant; and preferred quantities with which good yields are readily obtainable are about 0.2–0.5 mol per mol of aldoxime or half-mol of nitroso compound dimer reactant.

Temperatures employed in my process should be at least about 150° C. and may be much higher, e. g. 200° C. or more, as long as the reactants are maintained in the liquid phase. In synthesis of methacrylonitrile from isobutylenenitrosyl chloride adduct, for example, increasing the reaction temperatures from 150° to 165° C. gave considerable increase; from 165° C. to 190° C. gave only a slight further increase in methacrylonitrile yields. The reaction forming nitrile is exothermic, so that once the reaction mixture is brought to reaction temperature, temperatures may be maintained largely or entirely by the heat of reaction developed as the starting material is introduced at a controlled rate into the reaction mixture.

The following examples illustrate my invention but are to be interpreted as illustrative only and not in a limiting sense.

The method of operation was to introduce the reaction medium containing catalytic base and catalytic acid or acids into a reaction vessel equipped with an inlet for aldoxime or nitroso reactant, a stirrer, a thermometer for measuring temperatures in the reaction mixture, a condenser and receiver for distillate, and a Dry Ice-acetone trap for volatile products uncondensed in the receiver. The reaction medium was heated with stirring to reaction temperatures and the nitrile-forming reactant was then added at a rate to maintain the reaction temperature. Volatile products distilled over into the receiver. After all reactants had been introduced reaction temperatures were maintained until distillation of products virtually ceased and the vapor temperatures dropped.

Isolation of nitrile product was by fractionation of the crude organic layer of the distillate. Small additional amounts of nitrile could be recovered from the aqueous layer of the distillate.

In semi-continuous runs a portion of reaction medium was continuously introduced into the reaction vessel and a like quantity of reaction mixture was continuously withdrawn. Nitrile-forming reactant was introduced and products were recovered as described above. Suitably the reaction medium introduced is a solution, saturated at room temperature, of catalytic acid in catalytic base.

*Example 1.*—This example shows a preferred embodiment of my process resulting in formation of the unsaturated nitrile, methacrylonitrile, from a 1-nitroso 2-chloro dimeric compound, isobutylene-nitrosyl chloride adduct.

177.7 grams of 90% pure quinoline (1.37 mol equivalents) and 68.6 grams of phthalic acid (0.41 mol equivalent) were heated as described above to 170° C. and 150 grams of solid isobutylene-nitrosyl chloride adduct (1.235 mol equivalents), purified by washing with petroleum ether boiling 30°–60° C., were introduced in successive small portions with stirring at a rate to maintain the temperature as described above. Heating was continued for about another hour and the products collected were recovered.

Fractionation of the organic layer of the products in presence of a little tertiary butylcatechol as polymerization inhibitor and 15 grams of xylene gave a forerun of 2.05 grams boiling 57°–65° C., mainly methacrolein; a fraction boiling 65–85° C. (24.21 grams) which separated into 2 layers and was mainly the aqueous azeotrope of methacrylonitrile; a fraction boiling 85–90° C. (48 grams) practically pure methacrylonitrile; and a fraction boiling 90–120° C. (12.5 grams) mainly xylene. The total yield of methacrylonitrile obtained in these fractions and (in small amount) in the aqueous layers of the products was 72.14 grams (88.5% of theoretical). Recovery of liquid products including distillation residue was 99.3% of the charge. The only by-products present in significant amounts were methacrolein and methacrylaldoxime.

Other weak organic bases and vicinal dicarboxylic acids when substituted for quinoline and phthalic acid, respectively, in the procedure of the above example led to similar results. Among specific bases thus successfully substituted for quinoline were isoquinoline, tetramethylpyrazine, dimethylaniline, 2-nonylpyridine, 2,4,6-collidine and N-ethyl acetamide. The results obtained varied somewhat depending on the base used. Highest yields were obtained with quinoline, tetramethylpyrazine, and 3-methylisoquinoline as the catalytic base.

Among specific dicarboxylic acids successfully substituted for phthalic acid in the procedure of the above example were mixtures of alkenylsuccinic acids containing 6–16 carbon atoms in the alkenyl chains, methylsuccinic acid, itaconic acid, cyclohexenylsuccinic acid, 1,2 dicarboxy cyclohexene-4, and anthracene succinic acid. Again the yields varied somewhat depending on the choice of catalytic acid. Highest yields were obtained with phthalic acid and with $C_{10}$–$C_{16}$ alkenylsuccinic acid mixtures.

When the reaction of the above example was carried out by the semi-continuous procedure, using as reaction medium a solution, saturated at room temperature, of phthalic acid in quinoline, yields were substantially the same as obtained using batchwise operation.

Example 2.—When a vicinal dicarboxylic acid was absent from the reaction mixture, and isobutylene-nitrosyl chloride adduct was introduced in 3 batches as in Example 1 into a reaction medium containing about 1.1 mols of quinoline per mol of adduct (total adduct in the 3 batches), the yield of methacrylonitrile by the third batch reached 44% of theoretical.

Example 3.—When two-thirds of the quinoline of Example 1 was replaced by the equivalent amount of sodium hydrogen alkenylsuccinates containing 10 to 12 carbon atoms in the alkenyl chains, and $C_{10}$–$C_{12}$ alkenylsuccinic acid mixture replaced the phthalic acid of Example 1, yields of methacrylonitrile were about the same as obtained in Example 1.

Example 4.—This example shows conversion of an unsaturated aldoxime to the corresponding nitrile.

Methacrylaldoxime was added in accordance with the procedure of Example 1 to a reaction medium of quinoline and alkenylsuccinic acids containing 10 to 12 carbon atoms in the alkenyl chains. The reaction temperatures were about 170° C. Methacrylonitrile was obtained in a yield of 53.5% on the reacted aldoxime (which was 86% of the aldoxime introduced into the reaction zone).

Example 5.—This example shows conversion of a saturated aldoxime to the corresponding nitrile.

Normal butyraldoxime was added in accordance with the procedure of Example 1 to a reaction medium of quinoline and phthalic acid at temperatures of about 165° C. Normal butyronitrile was obtained in 43% yield on the starting oxime. In absence of phthalic acid, no visible reaction occurred.

In carrying out the conversion of isobutylene-nitrosyl chloride adduct to methacrylonitrile which is a preferred embodiment of my invention, I have found it desirable to maintain low concentrations of unreacted nitroso compound in the reaction medium, suitably by introducing the adduct into the reaction medium in a slow continuous stream or in small successive portions. It is also conducive to best yields of nitrile to use fresh adduct, since the adduct especially when impure tends to react on standing to form a yellow oil. The yields obtained from the partially decomposed adduct are not as good as from fresh adduct. It is not, however, necessary for high yields that pure solid adduct be used. Equally good or better yields based on nitrosyl chloride starting material may be obtained by using the whole fresh crude isobutylene-nitrosyl chloride reaction product instead of using purified solid adduct.

The reaction medium employed in my process may be used repeatedly without purification as long as enough free base remains to combine with any strong acid, such as hydrogen chloride, liberated during formation of the nitrile. Moreover, the strong acid component of the reaction medium may be removed and the recovered reaction mixture may then be reused.

I claim:

1. A process for synthesis of an aliphatic nitrile containing between 2 and 5 carbon atoms, inclusive, in the molecule, which comprises forming at temperatures of at least about 150° C. a liquid reaction mixture containing material of the group consisting of primary nitroso compound dimers and aldoximes, together with at least catalytic quantities of a weak organic base and at least catalytic quantities of a vicinal dicarboxylic acid dissolved in the reaction mixture under reaction conditions; and maintaining temperatures above about 150° C. while water distills from the reaction zone and nitrile is formed.

2. A process as defined in claim 1, wherein hydrogen chloride and at least an equivalent amount of dissolved base are present in the reaction mixture, together with at least catalytic quantities of a dissolved vicinal dicarboxylic acid.

3. A process as defined in claim 2, wherein the material treated is a 1-nitroso, 2-chloro dimeric compound.

4. A process as defined in claim 2, wherein the material treated is isobutylene-nitrosyl chloride adduct and the reaction is carried out in presence of quantities of dissolved base at least equivalent to the hydrogen chloride formed during the reaction.

5. A process as defined in claim 4, wherein the catalytic base employed is an aromatic base boiling above 170° C. at atmospheric pressure.

6. A process as defined in claim 4, wherein the catalytic base employed is a quinoline fraction, and the reaction temperatures are above 165° C.

7. A process as defined in claim 4, wherein the vicinal dicarboxylic acid employed is phthalic acid.

8. A process as defined in claim 4, wherein the vicinal dicarboxylic acid employed is an adduct of maleic acid and a hydrocarbon, said hydrocarbon having between 6 and 16 carbon atoms in the molecule.

9. A process for production of methacrylonitrile from isobutylene-nitrosyl chloride adduct, which comprises heating an aromatic tertiary nitrogen organic base boiling above 170° C. and about 0.2–0.5 mol of phthalic acid per mol of base employed to temperatures between about 165° C. and about 200° C., adding isobutylene-nitrosyl chloride adduct thereto at a rate at which the reaction temperatures are maintained within the range 165°–200° C. and in amounts not more than equivalent to the amounts of base introduced into the reaction mixture, distilling off methacrylonitrile from the reaction zone, and recovering and reemploying in the reaction zone phthalic acid and aromatic tertiary nitrogen organic base.

10. A process as defined in claim 9, wherein the base employed is a quinoline fraction.

11. A process as defined in claim 9, wherein the base employed is a quinaldine fraction.

12. A process as defined in claim 9, wherein the base employed is an isoquinoline fraction.

LEO J. SPILLANE.

REFERENCES CITED

The following references are of record in the file of this patent:

UNITED STATES PATENTS

| Number | Name | Date |
|---|---|---|
| 2,455,651 | Bortnick | Dec. 7, 1948 |
| 2,471,928 | Bortnick et al. | May 31, 1949 |